(12) United States Patent  
Dohm

(10) Patent No.: US 7,344,198 B1
(45) Date of Patent: Mar. 18, 2008

(54) FREE SPINNER HUBCAP ASSEMBLY

(76) Inventor: Darrell Dohm, 510 E. 1st Street, Urichsville, OH (US) 44683

( * ) Notice: Subject to any disclaimer, the term of this patent is extended or adjusted under 35 U.S.C. 154(b) by 120 days.

(21) Appl. No.: 11/389,593

(22) Filed: Mar. 27, 2006

(51) Int. Cl.
*B60B 7/20* (2006.01)
*B60B 7/14* (2006.01)

(52) U.S. Cl. .............................. 301/37.25; 301/37.371; 301/37.376

(58) Field of Classification Search ............ 301/37.25, 301/37.29, 37.371, 37.376, 37.101, 37.102, 301/37.106; 40/587
See application file for complete search history.

(56) References Cited

U.S. PATENT DOCUMENTS

| | | | | |
|---|---|---|---|---|
| 2,754,154 A | * | 7/1956 | Solow | 40/587 |
| 2,997,344 A | * | 8/1961 | Whiteman | 301/37.25 |
| 3,092,420 A | * | 6/1963 | Baldwin et al. | 301/37.25 |
| 3,158,946 A | * | 12/1964 | Upchurch | 40/587 |
| 3,722,958 A | * | 3/1973 | Marshall | 301/37.25 |
| 5,152,584 A | | 10/1992 | Maxwell, Jr. | |
| 5,263,770 A | | 11/1993 | Goudey | |
| 5,286,092 A | | 2/1994 | Maxwell, Jr. | |
| 5,659,989 A | * | 8/1997 | Hsiao et al. | 40/587 |
| 6,554,370 B2 | * | 4/2003 | Fowlkes | 301/37.25 |
| 6,702,396 B1 | * | 3/2004 | Wang | 301/37.25 |
| 6,981,749 B2 | * | 1/2006 | Cavazos et al. | 301/37.25 |
| 7,014,273 B1 | * | 3/2006 | Yang et al. | 301/37.25 |

* cited by examiner

*Primary Examiner*—Jason R. Bellinger
*Assistant Examiner*—Kip Kotter
(74) *Attorney, Agent, or Firm*—Crossley Patent Law; Mark Ashley Crossley

(57) ABSTRACT

A free spinner hubcap assembly for fitting truck wheels, the assembly is comprised of a hub mount and cross brace for securing to the wheel. The cross brace is offered in more than one embodiment for fitting wheels of different compositions. A bearing inner race is in direct communication with the hubcap of the assembly, with the outer race independent thereof. A spinner is attached to the outer race. The spinner is thereby free to spin independently of the hubcap and wheel.

19 Claims, 6 Drawing Sheets

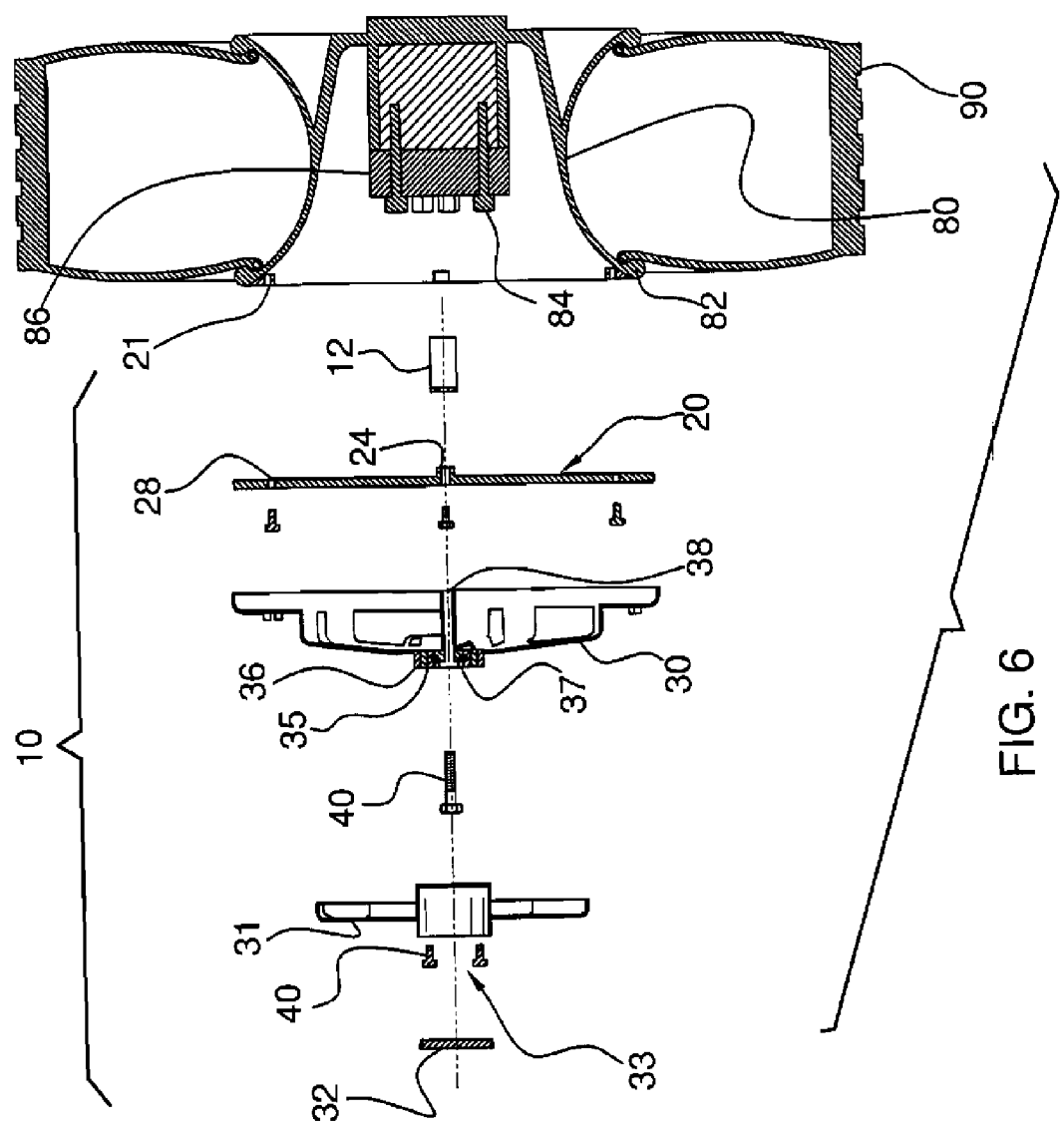

FREE SPINNER HUBCAP ASSEMBLY

BACKGROUND OF THE INVENTION

Appearance enhancements for vehicle's wheels are almost as old as motor vehicles themselves. Wheel covers are well known examples of vehicle appearance enhancements. Countless types of wheel covers are known in the art, with many designed for trucks. Truck wheels are dissimilar to passenger car wheels. Truck wheels have a deeper offset, or exterior backspacing, and a larger diameter than do passenger car wheels. Securing hubcaps to truck wheels requires designs that do not apply to passenger cars wheels. Conversely, passenger car wheel covers do not apply to large truck wheels. Truck wheel covers are offered in a number of appearances and mounting designs. The present apparatus offer improvements to the design and appearance of prior art wheel covers.

FIELD OF THE INVENTION

The present assembly relates to truck wheel covers and more specifically to a truck wheel cover with a spinner that spins freely of the hubcap and truck wheel.

DESCRIPTION OF THE PRIOR ART

Prior art does not teach a free spinner hubcap assembly that will accommodate a truck wheel, as does the present assembly. For example, U.S. Pat. No. 5,286,092 issued to Maxwell, Jr. on Feb. 15, 1994 teaches a decorative wheel cover for a truck wheel. The device is limited to a center cover and does not cover the entire wheel. The device includes no free spinning parts as does the present apparatus.

U.S. Pat. No. 5,263,770 issued to Goudey on Nov. 23, 1993 teaches a combined wheel cover and mounting device specifically for use on dual wheels of trucks. The device has no decorative moving parts as are provided by the present free spinner hubcap assembly.

U.S. Pat. No. 5,152,584 issued to Maxwell, Jr. on Oct. 6, 1992 teaches a decorative center cap and knock-off hub for trucks. The present free spinner hubcap assembly is dissimilar from this device which offers a center cap only and does not feature any spinning parts.

While the above-described devices fulfill their respective and particular objects and requirements, they do not describe a spinner hubcap assembly that provides for the advantages of the present free spinner hubcap assembly. In this respect, the present free spinner hubcap assembly substantially departs from the conventional concepts and designs of the prior art. Therefore, a need exists for an improved free spinner hubcap assembly.

SUMMARY OF THE INVENTION

The general purpose of the free spinner hubcap assembly, described subsequently in greater detail, is to provide a spinner hubcap assembly which has many novel features that result in an improved free spinner hubcap assembly which is not anticipated, rendered obvious, suggested, or even implied by prior art, either alone or in combination thereof.

To attain this, the free spinner hubcap assembly is comprised of components in combination. Each embodiment of the assembly is partially comprised of a hub mount. The hub mount is further comprised of legs, each leg having a foot. Each foot has a passage. The hub mount fastens to the truck wheel hub via the trucks lugs being passed through each passage, then tightened. The cross brace is next in the line of components that progress from proximal to the wheel and hub to the more distal components of the assembly. The cross brace is comprised of arms which form an X-shape. The ends of the arms differ in the varied embodiments of the assembly. One embodiment features a magnet on the end of each cross brace arm. The hub mount spaces the cross brace outwardly from the wheel hub so that the magnets of the arms meet the wheel rim. Steel wheel rims thereby aid in securing the invention to the truck's wheel. Another embodiment of the assembly's cross brace features a hole in the outer end of each arm. A brace receiver is fastened to the wheel rim to correspond with each of the cross brace holes. Fasteners are inserted through the holes and into the brace receivers to secure the cross brace to the wheel rim. This embodiment offers stability for the assembly when used with alloy truck wheels. Truck wheels, having deep offset (exterior backspacing) and large diameters, require that the assembly be properly stabilized. Both embodiments offer stability to the assembly's fastening to a wheel.

The hubcap component of the assembly is offered in a number of appearance variations, to please consumers. The hubcap is partially comprised of a centrally located bearing. The inner race of the bearing is in direct communication with the hubcap. The outer race is not in contact with the hubcap. The bearing's inner race is comprised of an aperture. A fastener is passed through the aperture, through the bore of the hubcap, through the opening in the center of the cross brace, and into the threaded orifice of the hub mount. Tightening the fastener secures the hubcap and cross brace to the hub mount, and therefore the wheel. The spinner of the assembly is preferably comprised of a hollow in the center of the spinner. The preferred embodiment of the assembly features four fasteners to secure the spinner to the outer race of the hubcap bearing. A cover covers the hollow and conceals the fasteners to provide a better appearance of the assembly. Spinners are offered in a variety of appearance designs and sizes to please a variety of customers. When the truck is in motion, the spinner is inclined to match the revolutions of the truck wheel. When the truck slows or stops, the spinner spins freely and independently of the wheel. The spinner thereby offers a pleasing active appearance to a slowed or unmoving wheel.

Thus has been broadly outlined the more important features of the improved free spinner hubcap assembly so that the detailed description thereof that follows may be better understood and in order that the present contribution to the art may be better appreciated.

It is therefore an object of the free spinner hubcap assembly to provide a hubcap for a truck wheel.

And, it is an object of the free spinner hubcap assembly to improve the cosmetic appearance of a truck tire and wheel.

It is also an object of the free spinner hubcap assembly to provide a spinner for a hubcap.

It is a further object of the free spinner hubcap assembly to provide a spinner that spins independently of a hubcap and a truck wheel.

It is an added object of the free spinner hubcap assembly to conceal the attachment of the assembly to the wheel.

And, it is an object of the free spinner hubcap assembly to conceal the attachment of the spinner to the hubcap.

These together with additional objects, features and advantages of the improved free spinner hubcap assembly will be readily apparent to those of ordinary skill in the art upon reading the following detailed description of presently preferred, but nonetheless illustrative, embodiments of the improved free spinner hubcap assembly when taken in conjunction with the accompanying drawings.

In this respect, before explaining the current embodiments of the improved free spinner hubcap assembly in detail, it is to be understood that the free spinner hubcap assembly is not limited in its application to the details of construction and arrangements of the components set forth in the following description or illustration. Those skilled in the art will appreciate that the concept of this disclosure may be readily utilized as a basis for the design of other structures, methods, and systems for carrying out the several purposes of the improved free spinner hubcap assembly. It is therefore important that the claims be regarded as including such equivalent constructions insofar as they do not depart from the spirit and scope of the free spinner hubcap assembly. It is also to be understood that the phraseology and terminology employed herein are for purposes of description and should not be regarded as limiting.

BRIEF DESCRIPTION OF THE DRAWINGS

FIG. 6 is a front cross sectional view of FIG. 5, taken along the line 6-6.

DETAILED DESCRIPTION OF THE DRAWINGS

With reference now to the drawings, and in particular FIGS. 1 through 6 thereof, the principles and concepts of the free spinner hubcap assembly generally designated by the reference number 10 will be described.

Figure 1:
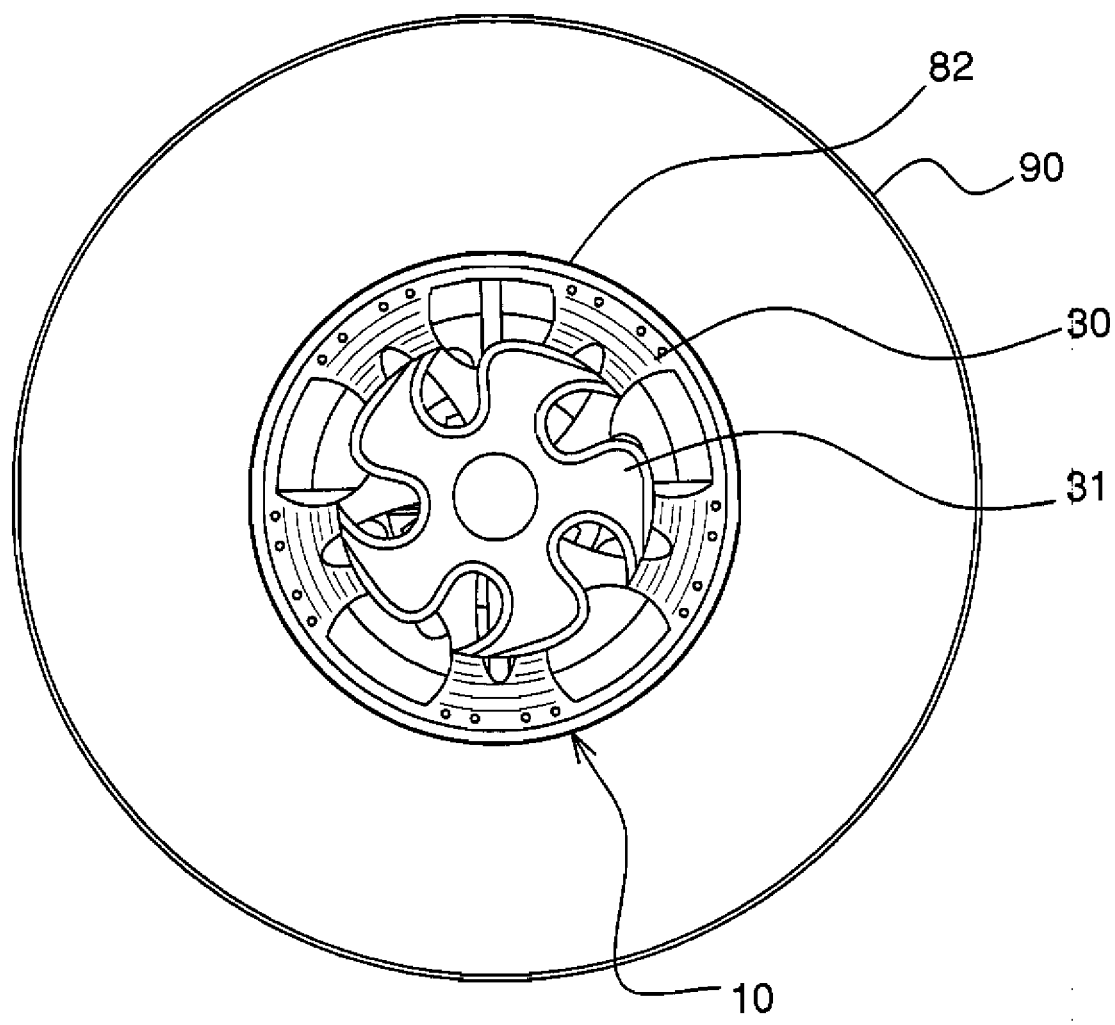
FIG. 1 is a side plan view of the assembly fastened to a wheel.
Figure 2:
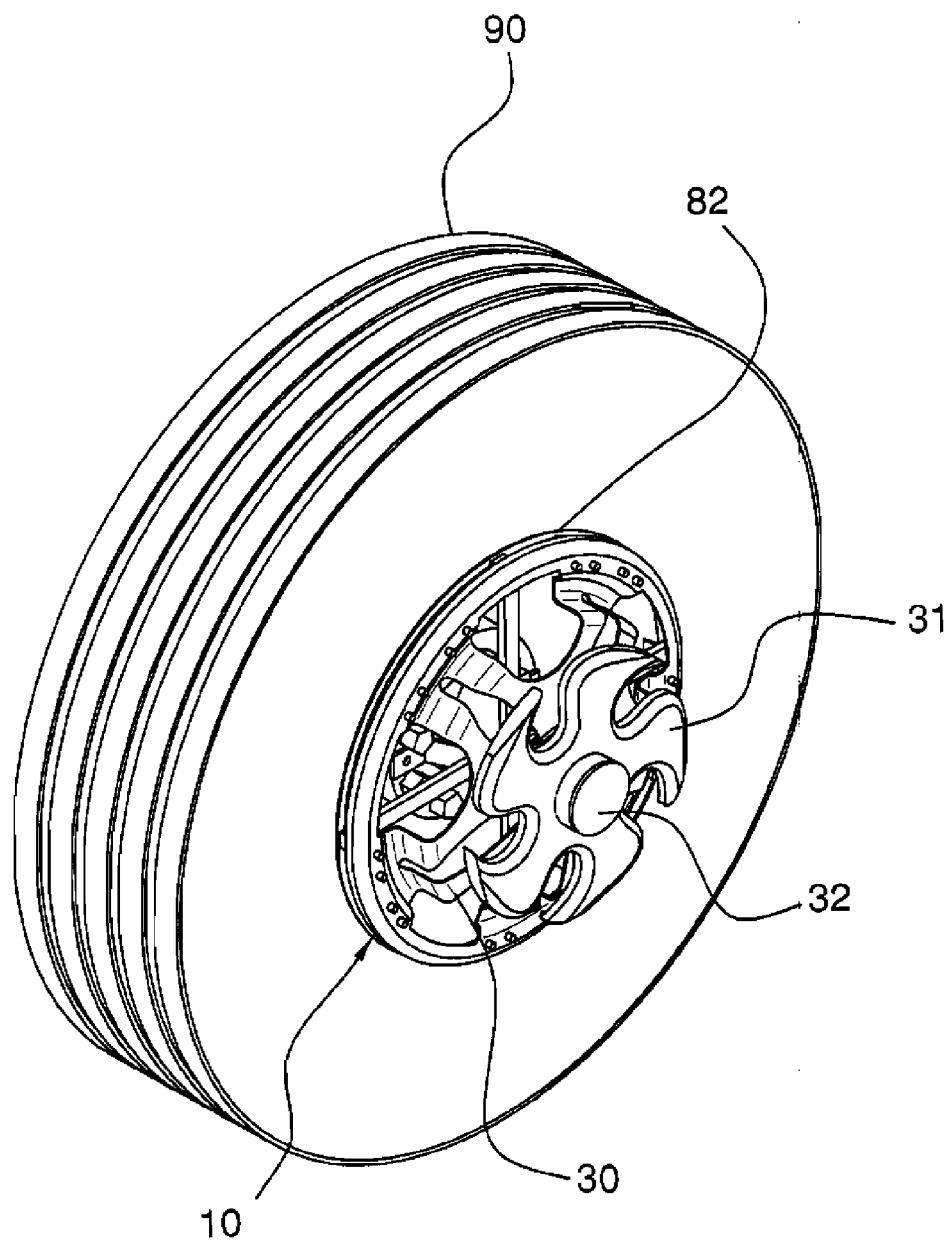
FIG. 2 is a side perspective view of the assembly fastened to a wheel.

Referring to FIGS. 1 and 2, the assembly 10 removably fits to the wheel 80 with the wheel rim 82 either totally covered or barely visible. The spinner 31 is removably attached to the hubcap 30. The center of the spinner 31 is further comprised of a cover 32. The spinner 31 spins freely of the hubcap 30. The attachment of the assembly 10 to the truck wheel is not visible. The cosmetic appearance of the assembly and the truck tire 90 and wheel 80 is thereby enhanced.

Figure 3:
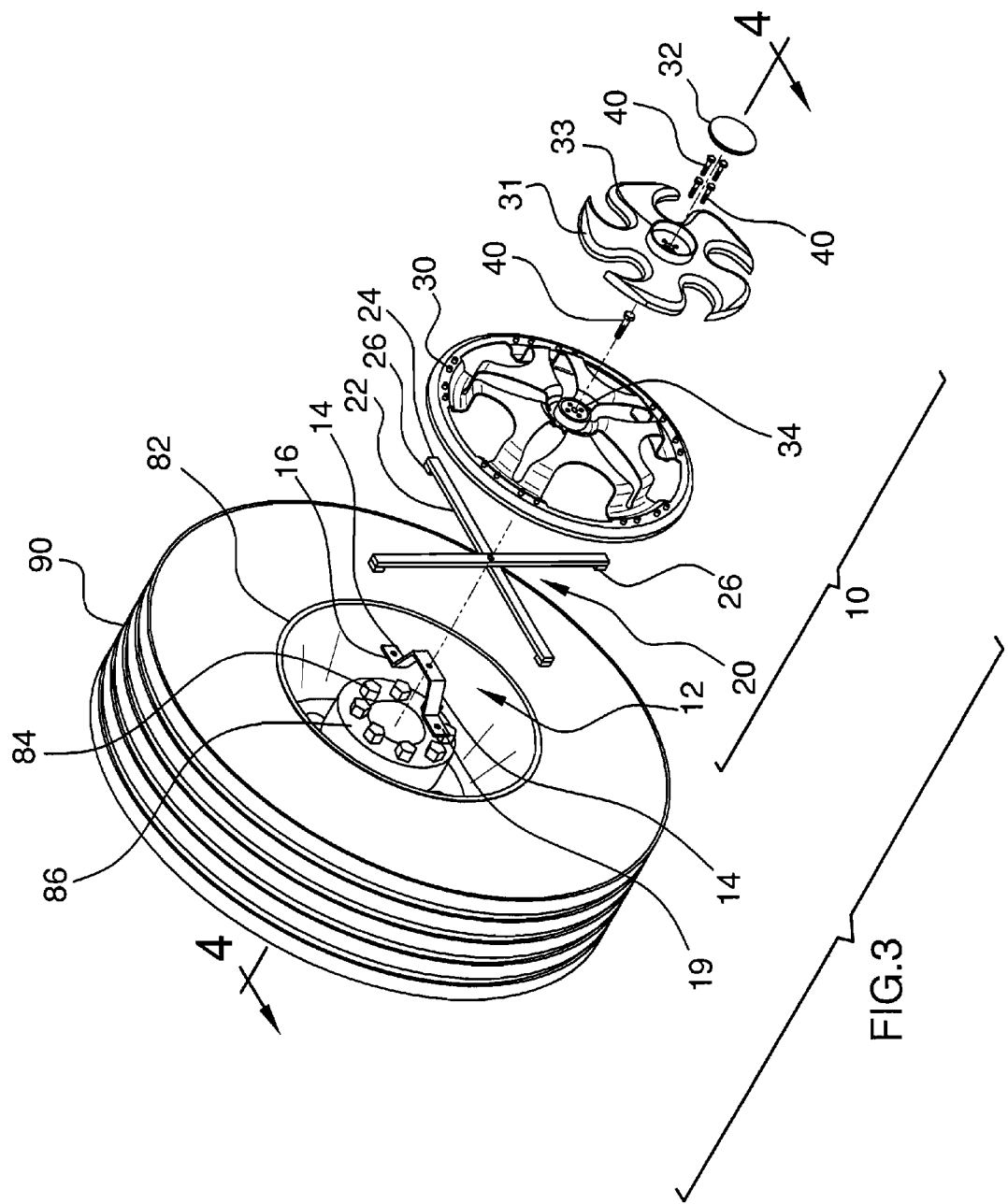
FIG. 3 is an exploded side perspective view of an embodiment of the assembly as it relates to a wheel.
Figure 4:
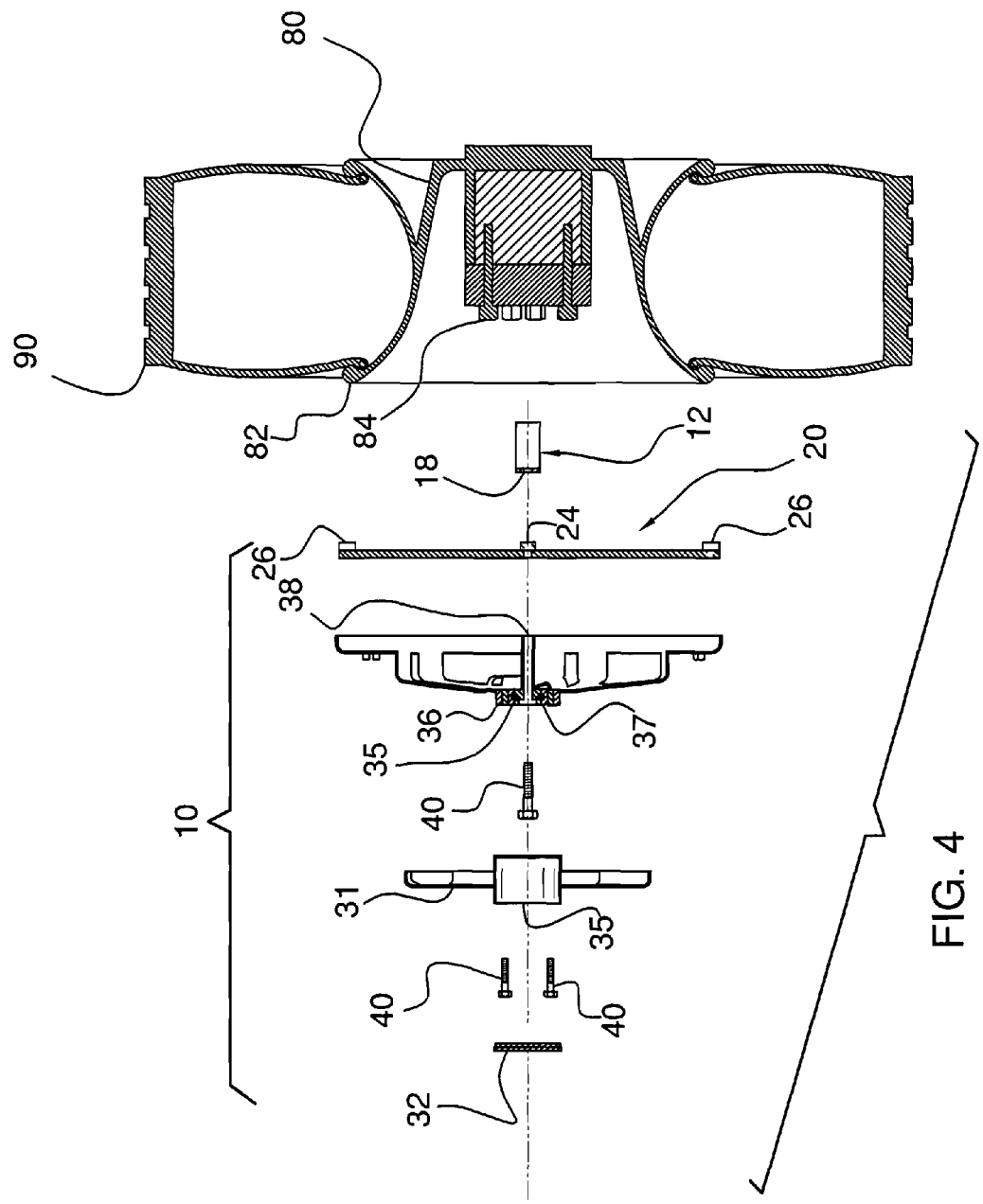
FIG. 4 is a front cross sectional view of FIG. 3, taken along the line 4-4.

Referring to FIGS. 3 and 4, the assembly 10 is comprised of a hub mount 12. The hub mount 12 is comprised of at least two opposing legs 14. A foot 16 is disposed at an outer end of each leg 14. A passage 19 is disposed in each foot 16. Each passage 19 is for receipt of a lug 84 of the wheel 80. The threaded orifice 18 is disposed in the center of the hub mount 12. The assembly 10 is further comprised of a cross brace 20. The cross brace 20 has a center and at least four arms 22 radiating outwardly therefrom. Each arm 22 has a central end and an outer end. In this embodiment of the assembly 10, the outer end of each arm 22 is comprised of a magnet 26. Each magnet 26 removably engages the rim 82 of the wheel 80. The center of the cross brace 20 is further comprised of an opening 24. The removable hubcap 30 is for covering the outside of the wheel 80. A bearing 34 is disposed within a center of the hubcap 30. The bearing 34 has an inner race 35 and an outer race 36. The inner race 35 is in direct communication with the hubcap 30. The inner race 35 is further comprised of an aperture 37. The fastener 40 is passed through the aperture 37, thence through the bore 38 of the hubcap 30. The fastener 40 is thence passed through the opening 24 of the cross brace 20. Tightening the fastener 40 into the threaded orifice 18 of the hub mount 12 thereby secures the above-listed components of the assembly 10. The spinner 31 is removably fastened to the outer race 36 of the bearing 34 of the hubcap 30. More than one fastener 40 is used for securing the spinner 31 to the outer race 36 of the bearing 34. In this embodiment of the assembly 10, four fasteners 40 are used. As the outer race 36 of the bearing is free to rotate independently of the inner race 35 and the hubcap 30, the spinner 31 thereby freely spins independently from the hubcap 30 and the wheel 80.

Figure 5:
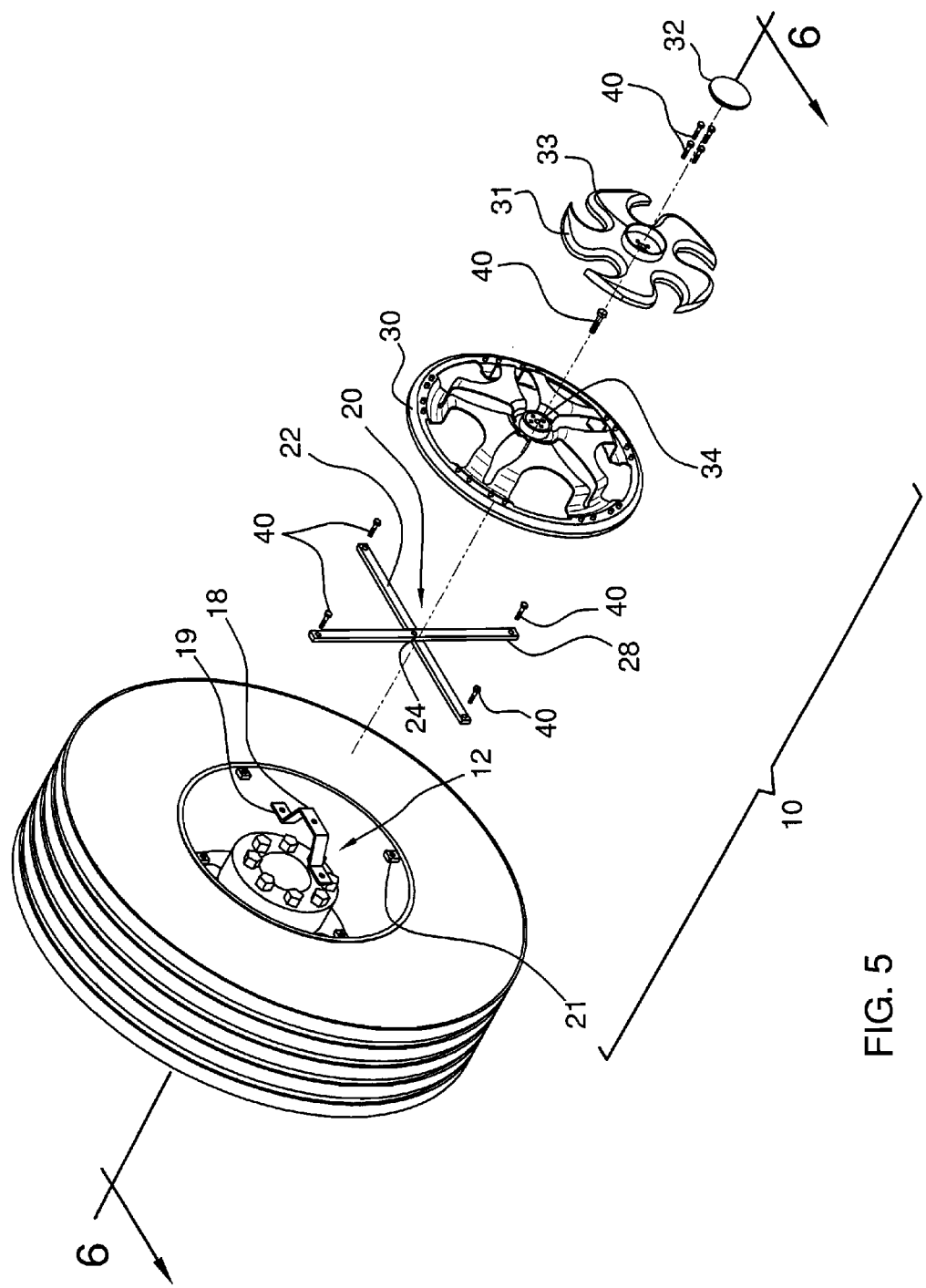
FIG. 5 is a side perspective view of an alternate embodiment of the assembly as it relates to the wheel.

Referring to FIGS. 5 and 6, an alternate embodiment of the assembly 10 is featured. The alternate embodiment features a different cross brace 20. The cross brace 20, like that of FIGS. 3 and 4, has a center and at least four arms 22 radiating outwardly therefrom. Each arm 22 has a central end and an outer end. The opening 24 in the outer end of each arm 22 provides for a fastener 40 to pass through. A number of brace receivers 21 are secured to the wheel rim 82. The number of brace receivers 21 matches the number of arm 22 passages 19. The brace receivers 21 are threaded. The cross brace 20 is thereby further secured to the wheel 80 with fasteners 40 passed through the holes 28 and into the brace receivers 21.

The two embodiments of the assembly 10 cross brace 21 provide for fitting the assembly 10 to a variety of truck wheels 80. The embodiment of the assembly 10 with cross brace receivers 21 and the cross brace 20 with magnets 26 on arms 22, FIGS. 3 and 4, can be used with steel wheels 80. First, the hub mount 12 is fastened to the wheel hub 86 via the passage 19 in the foot 16 of each leg 14 of the hub mount 12. The cross brace 20 is then placed in abutment with the hub mount 12. The magnets 26 hold the cross brace 20 in place for the next step of installation of the assembly 10. The hubcap 30 is placed against the cross brace 20. The fastener 40 is passed through the aperture 37 of the inner race 35 of the bearing 34 of the hubcap 30. The fastener passes through the aperture 37 of the hubcap 30. The fastener passes through the opening 24 of the cross brace 20. The fastener 40 is tightened into the threaded orifice 18 of the hub mount 12 to secure the above-detailed components. The spinner 31 is fastened to the outer race 36 of the hubcap bearing 34 via the fasteners 40. The cover 32 is placed over the hollow 33 to cover the fasteners 40 and provide a more pleasing appearance of the assembly 10.

When an alloy wheel 80 is encountered, the cross brace 20 with holes 28 in arms 22 is used. The brace receivers 21 are secured to the rim 82 of the wheel 80 to correspond with the holes 28 of the cross brace 20. Fasteners 40 are used to secure the cross brace 20 to the cross brace receivers 21. The hubcap 30 is secured to the cross brace 20 and wheel 80 by passing the fastener 40 through the inner race 35 aperture 37, thence through the bore 38 of the hubcap 30, thence through the opening 24 of the cross brace 20. The fastener 40 is then tightened to secure the above-listed components of the assembly 10 to the wheel 80.

The steps of securing the remaining components of the assembly 10 are then identical to the previous method. The spinner 31 is fastened to the outer race 36 of the bearing 34. The cover 32 conceals the fasteners 40.

Removal of the assembly 10 from the wheel 80 is accomplished via reversal of the above procedures.

With respect to the above description then, it is to be realized that the optimum dimensional relationships for the parts of the free spinner hubcap assembly, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the free spinner hubcap assembly.

Directional terms such as "front", "back", "in", "out", "downward", "upper", "lower", and the like may have been used in the description. These terms are applicable to the embodiments shown and described in conjunction with the drawings. These terms are merely used for the purpose of description in connection with the drawings and do not necessarily apply to the position in which the free spinner hubcap assembly may be used.

Therefore, the foregoing is considered as illustrative only of the principles of the free spinner hubcap assembly. Further, since numerous modifications and changes will readily occur to those skilled in the art, it is not desired to limit the free spinner hubcap assembly to the exact construction and operation shown and described, and accordingly, all suitable modifications and equivalents may be resorted to, falling within the scope of the free spinner hubcap assembly.

What is claimed is:

1. A free spinner hubcap assembly for a wheel, comprising in combination:
   a hub mount, the hub mount having at least two opposing legs;
   a foot at an outer end of each leg;
   a passage in each foot, each passage for receipt of a lug of the wheel;
   a threaded orifice in a center of the hub mount;
   a hubcap for covering the wheel;
   a bore through a center of the hubcap;
   a bearing within a center of the hubcap, the bearing having an inner race and an outer race, the inner race in direct communication with the hubcap;
   an aperture in a center of the inner race;
   a threaded fastener inserted through the inner race aperture, through the hubcap bore, and into the hub mount, the threaded fastener securing the hubcap to the hub mount;
   a spinner, the spinner attached to the outer race of the bearing,
   whereby the spinner freely spins independently of the hubcap.

2. The assembly in claim 1 wherein the spinner is attached to the bearing outer race via at least two fasteners.

3. The assembly in claim 2 wherein the spinner is further comprised of a cover, the cover removably fitted over the fasteners that hold the spinner to the bearing outer race.

4. The assembly in claim 2 wherein the spinner is further comprised of a hollow, the fasteners attaching the spinner to the bearing outer race fitted within the hollow, a cover covering the hollow.

5. A free spinner hubcap assembly for a wheel, comprising in combination:
   a hub mount, the hub mount having at least two opposing legs;
   a foot at an outer end of each leg;
   a passage in each foot, each passage for receipt of a lug of the wheel;
   a threaded orifice in a center of the hub mount;
   a cross brace, the cross brace having a center and at least four arms, each arm having a central end and an outer end;
   a means for removably securing the outer end of each arm of the cross brace to a rim of the wheel;
   an opening in the center of the cross brace;
   a removable hubcap for covering the wheel;
   a bearing within a center of the hubcap, the bearing having an inner race and an outer race, the inner race in direct communication with the hubcap;
   a spinner;
   more than one fastener for securing the spinner to the outer race of the bearing,
   whereby the spinner freely spins independently from the hubcap.

6. The assembly in claim 5 wherein the outer end of each arm of the cross brace is comprised of a magnet, each magnet for engaging a rim of the wheel.

7. The assembly in claim 6 wherein the spinner is further comprised of a hollow, the fasteners attaching the spinner to the bearing outer race fitted within the hollow;
   a cover covering the hollow.

8. The assembly in claim 5 wherein the spinner is further comprised of a cover, the cover removably fitted over the fasteners that hold the spinner to the bearing outer race.

9. The assembly in claim 6 wherein the spinner is further comprised of a cover, the cover removably fitted over the fasteners that hold the spinner to the bearing outer race.

10. The assembly in claim 5 wherein the spinner is further comprised of a hollow, the fasteners attaching the spinner to the bearing outer race fitted within the hollow;
    a cover covering the hollow.

11. A free spinner hubcap assembly for a wheel, comprising in combination:
    a hub mount, the hub mount having at least two opposing legs;
    a foot at an outer end of each leg;
    a passage in each foot, each passage for receipt of a lug of the wheel;
    a threaded orifice in a center of the hub mount;
    a cross brace, the cross brace having a center and at least four arms, each arm having a central end and an outer end;
    a hole in the outer end of each arm;
    at least four brace receivers, each brace receiver for attachment to a rim of the wheel;
    at least four cross brace fasteners, one cross brace fastener removably passed through each of the arm holes to engage each brace receiver respectively;
    an opening in a center of the cross brace;
    a removable hubcap for covering the wheel;
    a bore in a center of the hubcap;
    a bearing in the center of the hubcap, the bearing having an inner race and an outer race, the inner race in direct communication with the hubcap;
    an aperture in the inner race, the aperture in alignment with the bore of the hubcap;
    a threaded fastener passed through the aperture and bore, the threaded fastener passed through the opening of the cross brace, the threaded fastener removably anchored to the threaded orifice of the hub mount;
    a spinner;
    more than one fastener, each fastener for securing the spinner to the outer race of the bearing,
    whereby the spinner freely spins independently from the hubcap.

12. The assembly in claim 11 wherein the spinner is further comprised of a cover, the cover removably fitted to the spinner over the fasteners that hold the spinner to the bearing outer race.

13. The assembly in claim 12 wherein the spinner is of a smaller diameter than the hubcap.

14. The assembly in claim 12 wherein the spinner is of a diameter equal to the hubcap.

15. The assembly in claim 11 wherein the spinner is further comprised of a hollow, the fasteners attaching the spinner to the bearing outer race fitted within the hollow, a cover covering the hollow.

16. The assembly in claim 15 wherein the spinner is of a smaller diameter than the hubcap.

17. The assembly in claim 15 wherein the spinner is of a diameter equal to the hubcap.

18. The assembly in claim 11 wherein the spinner is of a smaller diameter than the hubcap.

19. The assembly in claim 11 wherein the spinner is of a diameter equal to the hubcap.

* * * * *